United States Patent [19]

Thackeray et al.

[11] Patent Number: 4,980,251
[45] Date of Patent: Dec. 25, 1990

[54] METHOD OF SYNTHESIZING A LITHIUM MANGANESE OXIDE

[75] Inventors: Michael M. Thackeray; Annemare De Kock, both of Pretoria, South Africa

[73] Assignee: CSIR, Pretoria, South Africa

[21] Appl. No.: 379,422

[22] Filed: Jul. 12, 1989

[30] Foreign Application Priority Data

Jul. 12, 1988 [ZA] South Africa .............. 88/5022

[51] Int. Cl.$^5$ .............................................. H01M 4/50
[52] U.S. Cl. ..................................... 429/224; 423/599
[58] Field of Search ............... 204/242, 291, 292, 293, 204/219; 423/593, 599; 429/224

[56] References Cited

U.S. PATENT DOCUMENTS 4,567,031 1/1986 Riley .................................... 423/593

FOREIGN PATENT DOCUMENTS 0265950 5/1988 European Pat. Off. .
0279235 8/1988 European Pat. Off. .
2196785 5/1988 United Kingdom .

OTHER PUBLICATIONS 35-782 JCPDS-ICDD Copyright 1988 (1 page).

Primary Examiner—John F. Niebling
Assistant Examiner—Kathryn Gorgos
Attorney, Agent, or Firm—Harness, Dickey & Pierce

[57] ABSTRACT

A method of synthesizing a lithium manganese oxide in accordance with the formula $Li_{1-x}Mn_2O_4$ in which $0 \leq x < 1$ and having a spinel-type crystal structure includes forming a mixture in finely divided solid form of at least one lithium salt such as $Li_2CO_3$ which decomposes when heated in air to form an oxide of lithium, and at least one manganese salt such as $MnCO_3$ which decomposes when heated in air to form an oxide of manganese. The mixture is heated in an oxidizing atmosphere to a temperature in the range 200°–600° C. to decompose the salts and to obtain the $Li_{1-x}Mn_2O_4$ having a spinel-type crystal structure.

12 Claims, 14 Drawing Sheets

METHOD OF SYNTHESIZING A LITHIUM MANGANESE OXIDE

BACKGROUND AND SUMMARY OF THE INVENTION

THIS INVENTION relates to a method of synthesizing an essentially single phase lithium manganese oxide in accordance with the formula $Li_{1-x}Mn_2O_4$ in which $0 \leq x < 1$ and having a spinel-type crystal structure. In particular, the invention relates to a method of synthesizing such oxide to produce an oxide which is suitable for use as a cathode in an electrochemical cell of the $Li/Li_yMnO_2$ type, with an anode comprising lithium or a suitable lithium-containing alloy. The invention also relates to the oxide when produced by the method; and to an electrochemical cell comprising said oxide as its cathode.

According to the invention, a method of synthesizing a lithium manganese oxide having a spinel-type crystal structure comprises forming a mixture in finely divided solid form of at least one lithium salt as defined herein and at least one manganese salt as defined herein, and heating the mixture in an oxidizing atmosphere to a temperature in the range 200°–600° C. to cause said salts to react with each other to obtain said lithium manganese oxide having a spinel-type crystal structure by simultaneous decomposition and cubic close packed oxygen lattice construction.

Certain forms of the lithium manganese oxide having a spinel-type structure produced by the method can be expressed by the formula $Li_{1-x}Mn_2O_4$ in which $0 \leq x < 1$, but it is to be noted that this $Li_{1-x}Mn_2O_4$ can have a $(Mn_2)O_4{}^{n-}$ framework structure in which the quantity of Mn cations varies from the stoichiometric value.

By a 'lithium salt as defined herein' is meant a lithium salt which decomposes when heated in air to form an oxide of lithium an, correspondingly, by a 'manganese salt as defined herein' is meant a manganese salt which decomposes when heated in air to form an oxide of manganese.

The salt of lithium may be a member of the group consisting of $Li_2CO_3$, $LiNO_3$ and mixtures thereof, the salt of manganese being a member of the group consisting of $Mn(NO_3)_2$, $MnCO_3$ and mixtures thereof. Forming the mixture may be in a stoichiometric ratio so that there is an at least approximate molar ratio of Li:Mn of 1:2, optionally with a slight excess of either salt, i.e. such that the ratio is 1:1.7–1:2.5, preferably 1:1.9–1:2.1. Forming the mixture may be by milling, e.g. in a ball mill containing alumina grinding media or in a mortar and pestle so that the mixture has an average particle size of at most 250 microns. Instead, forming the mixture of the lithium and manganese salts may be by making a slurry in a solvent selected from the group consisting of water, ethanol and mixtures thereof and thereafter drying the mixture until the solvent content is at most 10% by mass, e.g. by drying at 60°–90° C. in a drying oven for 12 hours.

The heating of the mixture may be in air to a temperature of 300°–420° C., e.g. 400° C.; the mixture being held at the maximum temperature, preferably with an accuracy of ±10° C., for a period of at least 2 hrs, e.g. 2–5 hours. Heating may typically be at a rate of 60° C./hr; and may be followed by cooling by quenching in air or slow cooling at the natural furnace cooling rate. The heating may be of the mixture in powder form. However, the method conveniently includes the step of, prior to the heating, compacting the mixture, by pressing it at a pressure of 5–10 MPa to form a unitary artifact, so that, after the heating, the lithium manganese oxide of the formula $Li_{1-x}Mn_2O_4$ is in the form of a self-supporting unitary artifact.

Spinel compounds have structures that can be represented by the general formula $A(B_2)X_4$ in which X atoms are arranged in a cubic-close-packed fashion to form a negatively charged anion array comprised of face-sharing and edge-sharing X tetrahedra and octahedra. In the formula $A(B_2)X_4$, the A atoms are tetrahedral-site cations and the B atoms are octahedral-site cations, i.e. the A cations and B cations occupy tetrehedral and octahedral sites, respectively. In the ideal spinel structure, with the origin of the unit cell at the centre ($\bar{3}m$), the close-packed anions are located at the 32e positions of the space group Fd3m. Each unit cell contains 64 tetrahedral inerstices situated at three crystallographically non-equivalent positions 8a, 8b and 48f, and 32 octahedral interstices situated at the crystallographically non-equivalent positions 16c and 16d. In an $A(B_2)X_4$ spinel the A cations reside in the 8a tetrahedral interstices and the B cations in the 16d octahedral interstices. There are thus 56 empty tetrahedral and 16 empty octahedral sites per cubic unit cell. For the present invention $A(B_2)X_4$ is represented by $Li(Mn_2)O_4$.

Therefore, the B cations of the $(B_2)X_4{}^{n-}$ framework structure may be regarded as being located at the 16d octahedral positions and the X anions located at the 32e positions of the spinel structure. The tetrahedra defined by the 8a, 8b and 48f positions and octahedra defined by the 16c positions of the spinel structure, thus, form the interstitial space of the $(B_2)X_4{}^{n-}$ framework structure for the mobile Li cations, for diffusion therethrough during the electrochemical discharge and charge reactions.

Furthermore, the cathodes of the present invention need not necessarily be stoichiometric compounds. For example, cathodes may be synthesized in which defects are created by varying the quantity of Li ions at the A sites to generate a lithium-deficient spinel $Li_{1-x}(Mn_2)O_4$ with $0 \leq x < 1$; alternatively cathodes may be synthesized in which defects are created by varying the quantity of Mn cations in the framework structure such that additional Li cations may enter the framework. In certain instances, these additional Li cations may partially occupy the 16d octahedral sites normally occupied by the Mn cations. Under such circumstances, these partially occupied octahedra may be considered to form part of the interstitital space. Conversely, cathodes may also be synthesized, in which part of the interstitial spaces defined by the 8a, 8b and 48f tetrahedral and 16c octahedral interstices of the spinel structure may be occupied by Mn cations, thereby rendering these particular sites at least partially inaccessible to the mobile Li cations. It follows that, in compounds of the formula $Li_{1-x}Mn_2O_4$ of the lithium manganese oxide synthesized by the method of the present invention, the Mn:O atomic ratio need not be precisely 1:2, but will be about 1:2, so that the formula $Li_{1-x}Mn_2O_4$ is defined as covering also compounds in which the Mn:O ratio is slightly greater than 1:2 and compounds in which said ratio is slightly less than 1:2, the formula $Li_{1-x}Mn_2O_4$ merely being used for convenience of expression.

The $Li_{1-x}Mn_2O_4$ spinel-type oxide product of the present invention can be described, broadly, as $Li_yMnO_2$ in which y is not greater than 0.5. When this $Li_yM$-

$nO_2$ is assembled into a cell of the type Li (anode)/electrolyte/$Li_yMnO_2$ (cathode), charging will involve a reduction of the value of y to a theoretical minimum value of 0 in the fully charged state. While the electrolyte may be a lithium-containing molten salt electrolyte, it is conveni.e.ntly a room-temperature electrolyte such as $LiClO_4$, $LiAsF_6$ or $LiBF_4$, dissolved in an organic solvent such as propylene carbonate or dimethoxyethane. It is also in principle possible to discharge such cells further than a partially discharged state in which y in $Li_yMnO_2$ is 0.5, up to a practically useful value for y of 1. Although y values in excess of 1 are possible, the electrochemical reaction when y exceeds 1.0 will be associated with a sharp drop in voltage from an open circuit value of approximately 3 V to below 2 V, which limits usefulness. In practice, the value of y will be controlled between conveni.e.nt values, e.g. a value of y=0.2 in the nominally fully charged state and a value of y=1.0 in the nominally fully discharged state.

The invention also extends to lithium manganese oxide in (accordance with the formula $Li_{1-x}Mn_2O_4$ whenever synthesised by the method described above, particularly for use as a cathode in an electrochemical cell.

The invention also extends to an electrochemical cell having a cathode comprising a lithium manganese oxide of formula $Li_{1-x}Mn_2O_4$ as described above, an anode which comprises lithium metal or a lithium-containing alloy, and an electrolyte whereby the anode is electrochemically coupled to the anode.

The cell may, thus, be of the type described above.

The cells of the invention may be primary cells or rechargeable secondary cells. Secondary cells can in principle be loaded with the $Li_{1-x}Mn_2O_4$, i.e. $Li_yMnO_2$ in which y is not more than 0.5, but may be loaded, if more conveni.e.nt, with y at some other value. In practice the $Li_{1-x}Mn_2O_4$ of the cathode will usually be compacted, as mentioned above, optionally with a suitable binder, and for cathode use a suitable electronically conductive material to act as current collector may be incorporated in the compacted cathode. Thus, polytetrafluoroethylene (PTFE) may be used as a binder and acetylene black (carbon) may be used as current collector.

Accordingly, in a particular embodiment of the cell, the lithium manganese oxide of the cathode may be present in the cathode in admixture with a binder and with an electronically conductive current collector in a compacted artifact, the electrolyte being a room-temperature electrolyte comprising a member of the group consisting of $LiClO_4$, $LiAsF_6$ and $LiBF_4$ dissolved in an organic solvent selected from the group consisting of propylene carbonate and dimethoxyethane.

Without being bound by theory, the Applicant believes that an advantage of the present invention, whereby particular utility of the $Li_{1-x}Mn_2O_4$ as a cathode of a cell of the type in question is obtainable, arises from the relatively poorly developed crystallinity and high surface area thereof as discussed in more detail hereunder. This poorly developed crystallinity is to be contrasted with the well developed crystallinity obtained when a lithium salt such as $Li_2CO_3$ is heated in a similar fashion in air with, for example, $MnO_2$, $Mn_2O_3$ or $Mn_3O_4$, to a temperature in the range of 700° C. to 900° C. The advantage of using e.g. $Mn(NO_3)_2$ or $MnCO_3$ precursors in the reaction as opposed to manganese oxides, such as those mentioned above, is that the nitrate or carbonate compounds decompose rapidly within a period of 2-5 hours at relatively lower temperatures, particularly in the presence of the lithium salt, to produce a virtually amorphous intermediate, which can be expressed as $Li_2O.4MnO$ from which the $Li_{1-x}Mn_2O_4$ product, and in particular, its cubic close packed oxygen lattice, must be reconstructed. This accounts for the poorly developed crystallinity and strain in the individual particles. When starting from manganese oxide precursors e.g. as mentioned above, it is believed that the retention of much of the oxygen content makes it more difficult to obtain a single-phase $Li_{1-x}Mn_2O_4$ product at these relatively low temperatures, with the required electrochemical properties.

The oxidizing atmosphere under which the heating takes place may be an oxygen-containing atmosphere, conveniently air.

BRIEF DESCRIPTION OF THE DRAWINGS

By way of comparison, reference is made to the accompanying drawings. In the drawings, FIGS. 1-10 comprise X-ray diffraction patterns, i.e. plots of intensity against 2-theta for the 2-theta range of 10°-70° for the $Li_{1-x}Mn_2O_4$ produced in accordance with the invention, and for samples of $Li_{1-x}Mn_2O_4$ produced in accordance with controls using CuK-alpha radiation. These plots are as follows.

Further in the drawings.

DETAILED DESCRIPTION OF THE PREFERRED EMBODIMENTS

With regard to above-mentioned drawings, it should be noted that FIGS. 1-5 display diffraction patterns characteristic of very highly crystalline LiMn$_2$O$_4$ products, when prepared at 800° C. When the temperature is dropped to 400° C. as in FIGS. 6 and 7, sharp peaks characteristic of highly crystalline LiMn$_2$O$_4$ and unreacted manganese oxide starting materials are observed In FIG. 8 at 400° C. peaks characteristic of a two-phase product consisting of Li$_{1-x}$Mn$_2$O$_4$ and Mn$_2$O$_3$ (a decomposition product of the MnCO$_3$ starting material) are observed.

Figure 6:
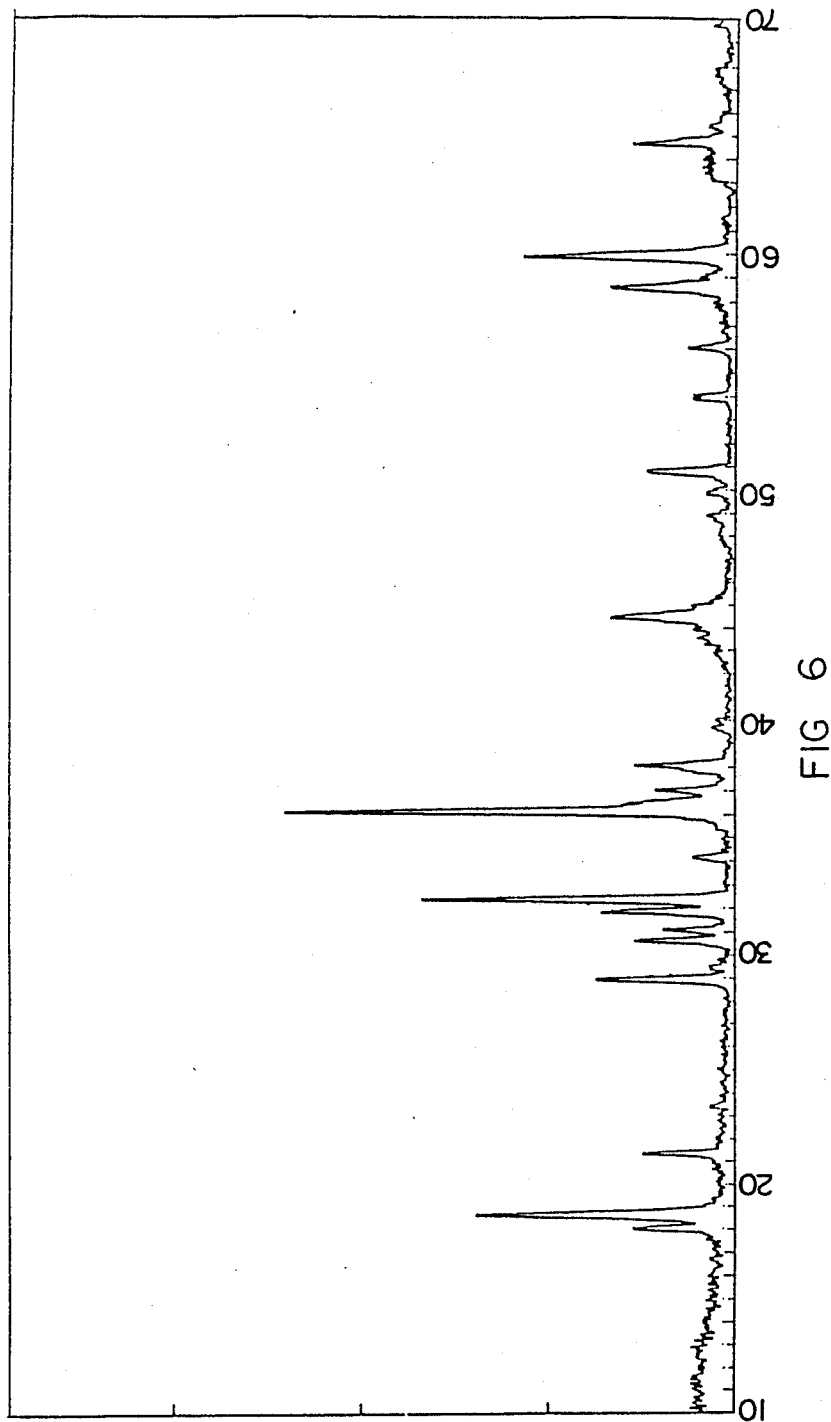
FIG. 6, a control, shows a product of the reaction $4Mn_3O_4+3Li_2CO_3$ heated to 400° C. in air for 14 hours.
Figure 7:
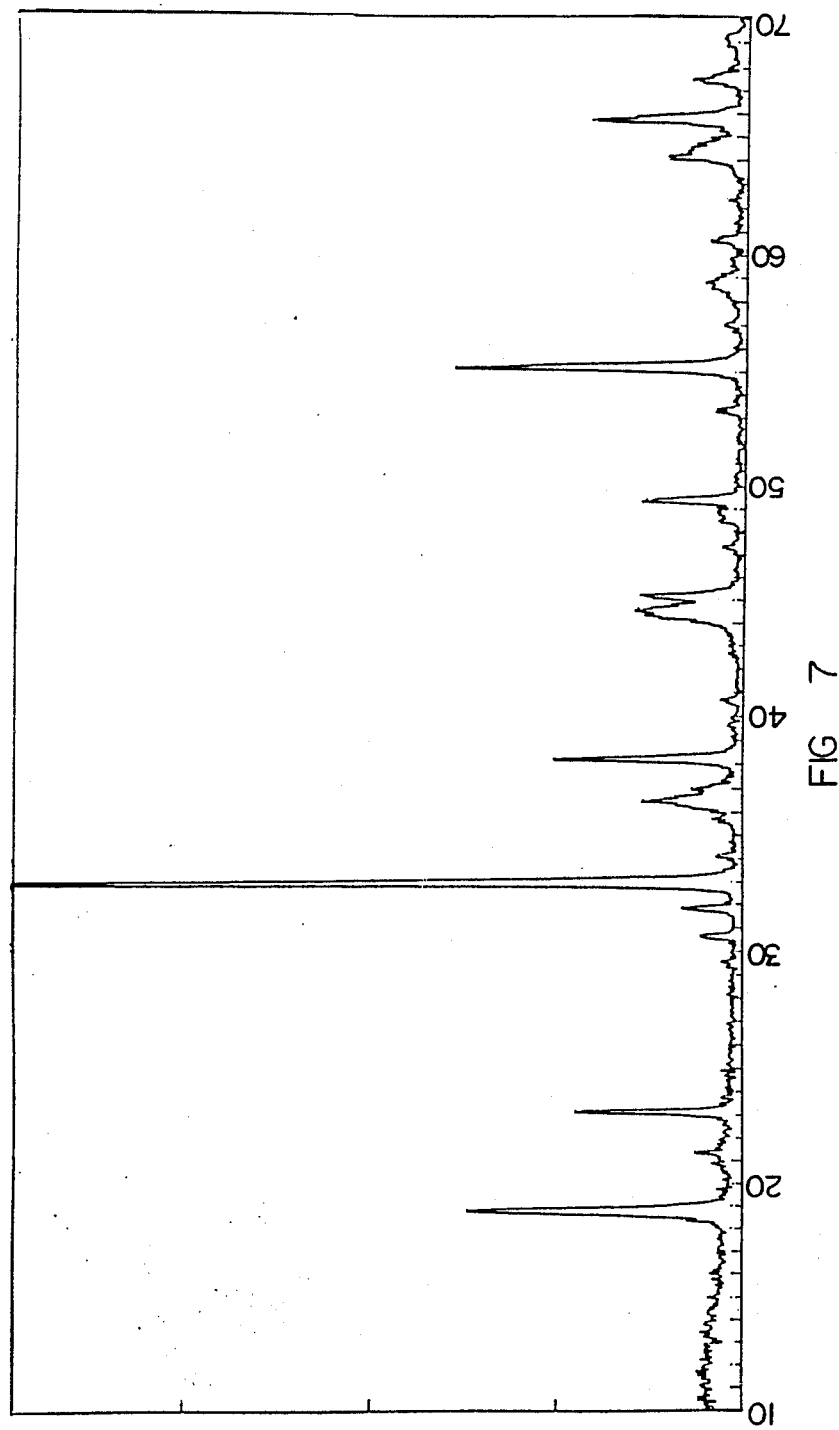
FIG. 7, a control, shows a product of reaction $2Mn_2O_3+Li_2CO_3$ heated to 400° C. in air for 14 hours.
Figure 8:
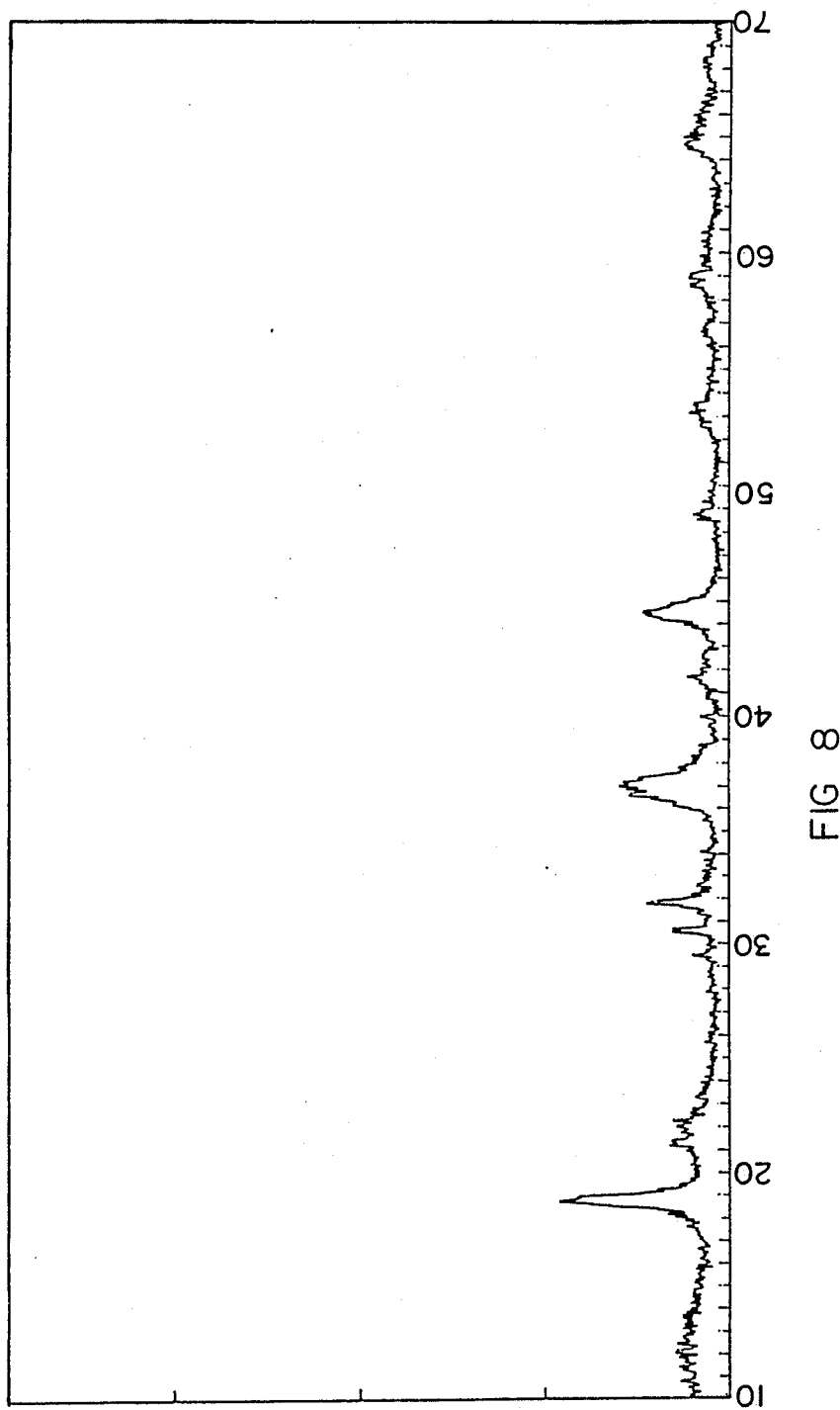
FIG. 8, a control, shows a product of reaction $4MnCO_3+Li_2CO_3$ heated to 400° C. in air for 14 hours.
Figure 9:
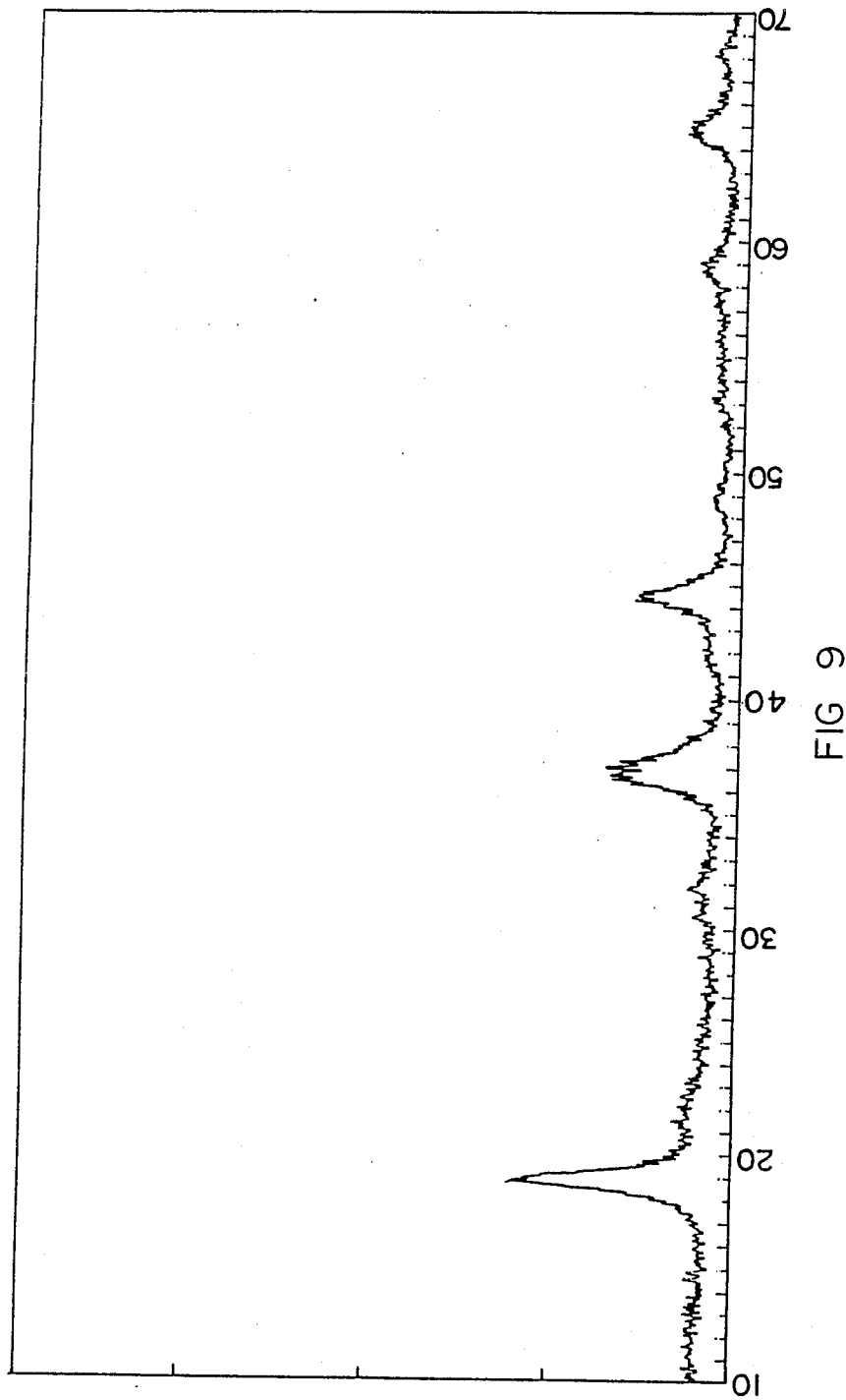
FIG. 9, the invention, shows $Li_{1-x}Mn_2O_4$ produced from $4MnCO_3+Li_2CO_3$ heated to 400° C. in air for 14 hours.
Figure 10:
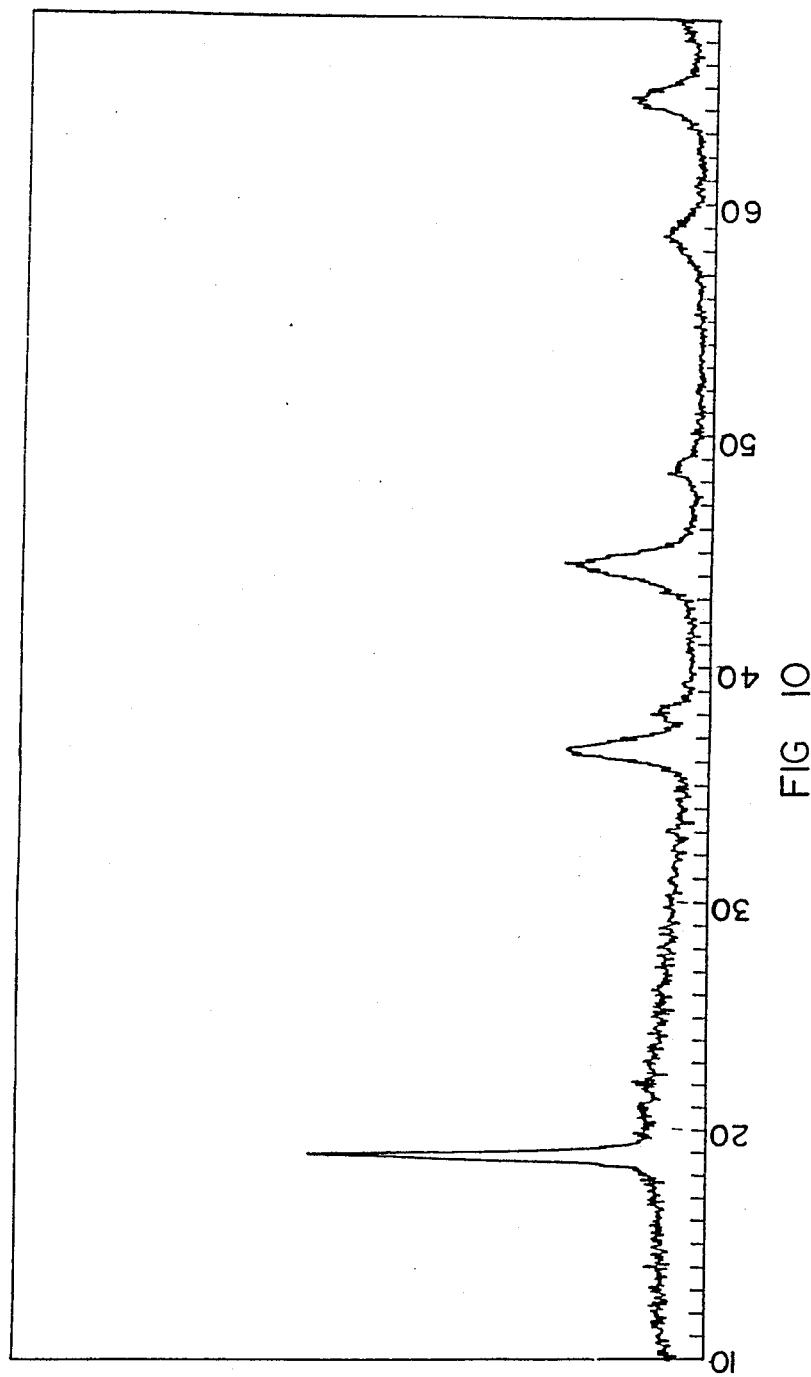
FIG. 10, the invention, shows $Li_{1-x}Mn_2O_4$ produced from $4Mn(NO_2)_3.4H_2O+LiNO_3.3H_2O$ heated in air to 400° C. for 5 hours.

With regard to FIGS. 9 and 10, particularly FIG. 9, in contrast to FIGS. 6-8, the X-ray diffraction patterns exhibit peaks characteristic of essentially single-phase Li$_{1-x}$Mn$_2$O$_4$ product of low crystallinity (broad peaks), which patterns and peaks are believed to be attributable to strain in the crystals, introduced during formation thereof.

Figure 11:
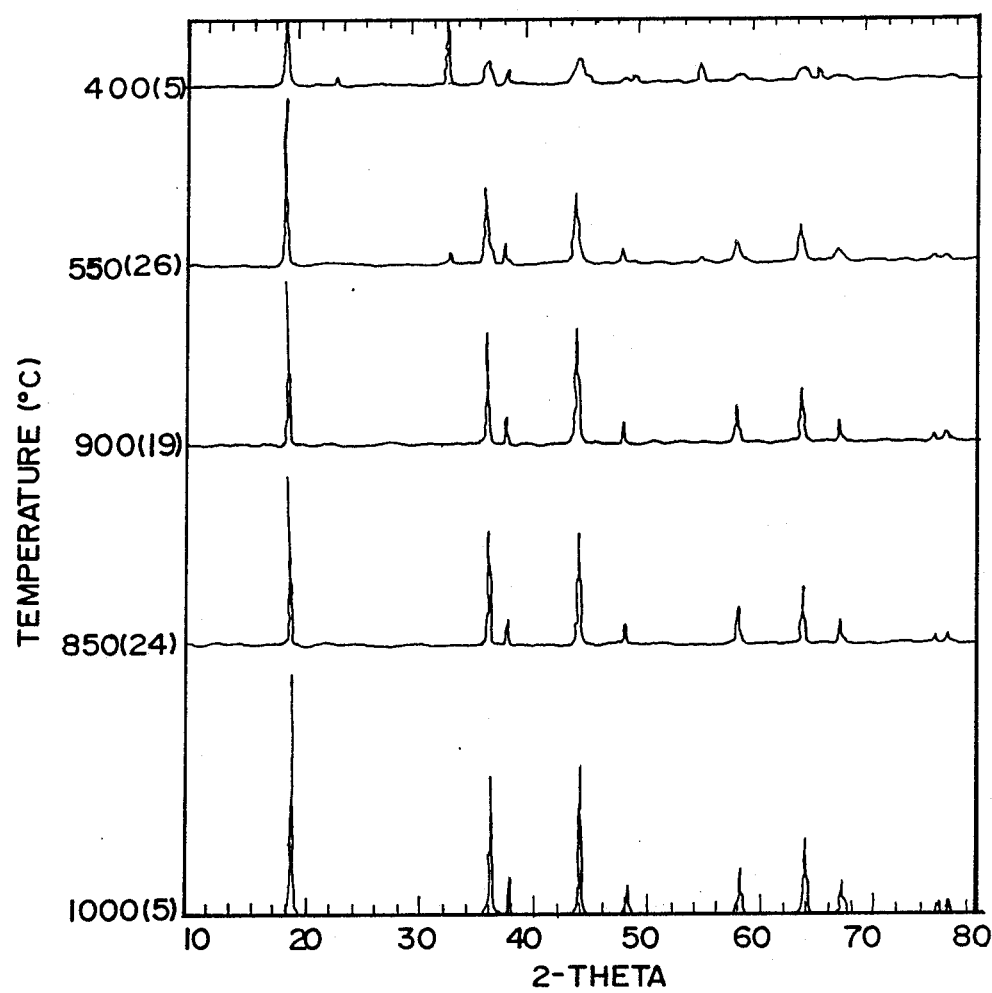
FIG. 11, a control, shows the X-ray diffraction patterns for the 2-theta range 10°-80° of samples taken at various stages of the reaction sequence: $Mn_2O_3$ reacted with $Li_2CO_3$ at 400° C. for 5 hours, at 550° C. for 26 hours, at 700° C. for 19 hours, at 850° C. for 24 hours and finally at 000° C. 5 hours.
Figure 12:
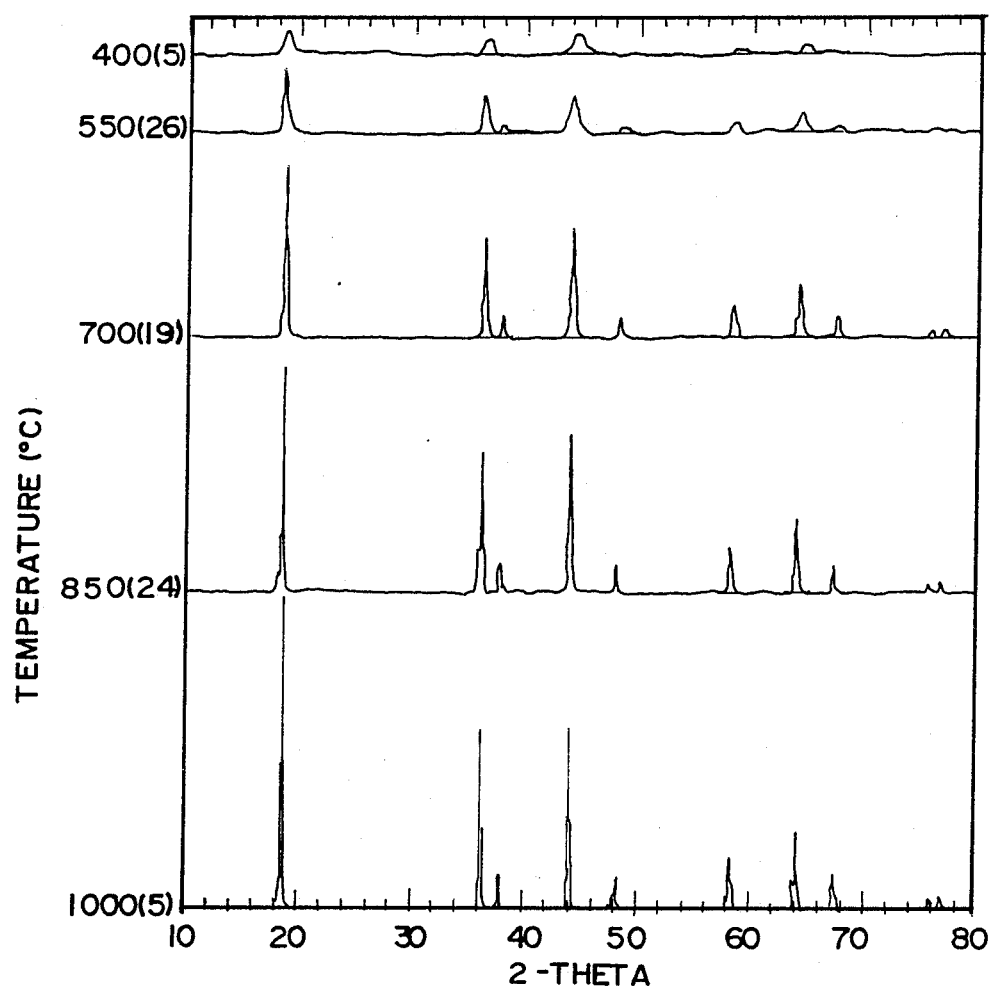
FIG. 12, the invention, shows the X-ray diffraction patterns of samples taken at various stages of the reaction sequence: $MnCO_3$ reacted with $Li_2CO_3$ at 400° C. for 5 hours, at 550° C. for 26 hours, at 700° C. for 19 hours, at 850° C. for 24 hours and finally at 1000° C. for 5 hours.

FIG. 12 when compared with FIG. 11 clearly indicates the single phase spinel pattern of Li$_{1-x}$Mn$_2$O$_4$ from 400° C. to 1000° C. The broad peaks at 400° C. and 550° C. can be attributed to the strain in the Li$_{1-x}$Mn$_2$O$_4$ particles that is established during the reconstruction of the cubic close packed oxygen sub-array. The X-ray patterns in FIG. 11 corresponding to the preparations at 400° C. and 550° C. contrast strongly with those in FIG. 12, e.g. impurity peaks such as that at 33° 2-theta , (which are deleterious for cell performance) of unreacted Mn$_2$O$_3$ are clearly evident; and the peaks in FIG. 11 are significantly sharper, e.g. at 400° and 550° C.

Heating e.g. Li$_2$CO$_3$ or LiNO$_3$ with MnCO$_3$ to completion in accordance with the reactions:

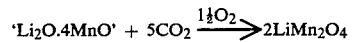

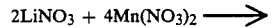

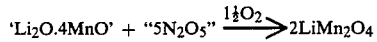

(in which "5N$_2$O$_5$" is a mixture of oxides of nitrogen)

would provide LiMn$_2$O$_4$ with a poorly developed crystallinity and high surface area. However, in terms of the present invention, the heating and reactions are not to completion so that, instead of LiMn$_2$O$_4$, the phase Li$_{1-x}$Mn$_2$O$_4$ is obtained. This arises from the fact that the reaction of the starting salts leads to an intermediate, 'Li$_2$0.4MnO' which is substantially amorphous and has a very poorly developed initial degree of crystallinity. This in turn leads to the production of Li$_{1-x}$Mn$_2$O$_4$ With a correspondingly poorly developed crystallinity as characterized by the substantially broader peaks in the powder X-ray diffraction pattern obtained therefor. This product has been found to exhibit a high degree of electrochemical activity in primary electrochemical cells of the type described above, and has been found to operate reversibly, which makes it attractive as a cathode material for a secondary cell of the type described above Furthermore, the reaction whereby the Li$_{1-x}$Mn$_2$O$_4$ is synthesized can, within limits, be tailored in accordance with the present invention, e.g. by controlling the reaction temperature and reaction time, to produce materials with an optimized electrochemical activity for their precise intended purpose in electrochemical cells.

Figure 13:
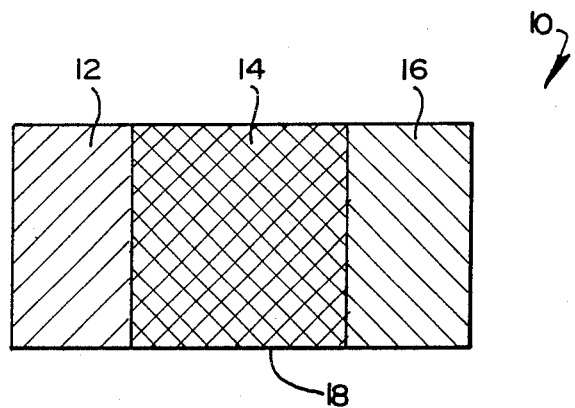
FIG. 13 shows a schematic representation of an electrochemical cell according to the invention.

The invention will now be described with reference to the following illustrative example of a cell proposed in accordance with the invention, and with reference to the accompanying diagrammatic drawing, FIG. 13, which shows a schematic representation of a cell according to the invention. In the drawing, is shown a cell of the type Li (anode)/1 Molar LiClO$_4$ in propylene carbonate (electrolyte) /Li$_y$MnO$_2$ (in which the Li$_y$MnO$_2$ is provided by the Li$_{1-x}$Mn$_2$O$_4$ of the present invention) pTFE, acetylene black (cathode). The cell is designated 10 and the anode, electrolyte and cathode are respectively designated 12, 14 and 16 and are contained in an insulating housing 18 with the anode separated from the cathode by the electrolyte and suitable terminals in electronic contact respectively with the anode and the cathode. In the cathode, the Li$_{1-x}$Mn$_2$O$_4$ in powder form is mixed with PTFE and acetylene black.

In the cathode, the PTFE is a binder and the acetylene black is a current collector. The Li$_{1-x}$Mn$_2$O$_4$ in powder form is mixed in a mass proportion of 70-80% Li$_{1-x}$Mn$_2$O$_4$ with 30-20% PTFE and acetylene black, with the PTFE and acetylene black in a mass ratio of 1:2, and compacted at 5-10 MPa.

Stoichiometric LiMn$_2$O$_4$ has a cubic unit cell with a lattice parameter 'a' of 8.24 Angstrom units. Lithium can be extracted from this unit cell without disturbing the Mn$_2$O$_4$ spinel framework either chemically, for example using Molar HCl, or electrochemically. Using chemical methods, it is possible to synthesize the cubic Mn$_2$O$_4$ phase commonly known as lambda MnO$_2$, which has a lattice parameter 'a' of 8.03 Angstrom units. Cubic lithium-deficient phases of Li$_{1-x}$Mn$_2$O$_4$ with $0 \leq x < 1$ can be prepared With intermediate 'a' values. When preparing Li$_{1-x}$Mn$_2$O$_4$ cathodes at 400° C. according to the invention using lithium salts and manganese salts such that the Li:Mn molar ratio is 1:2, it is often observed that a spinel material is formed which is lithium-deficient. In these cases, it may be desirable to wash off the unreacted lithium salt component, e.g. using water, in case it is undesirable in the cell.

The following is a Table of surface areas determined by BET methods using nitrogen gas, in m$^2$/g of Li$_{1-x}$Mn$_2$O$_4$ compared with gamma-MnCO$_3$ samples, of the type conventionally used in primary Li/MnCO$_3$ electrochemical cells. The improved electrochemical performance obtained from a Li$_{1-x}$Mn$_2$O$_4$ cathode prepared at 400° C. (see Sample 3 in the Table) in accordance with the invention, compared with an LiMn$_2$O$_4$ control cathode prepared at e.g. 850° C. (Sample 6 in the Table) can be attributed to the remarkable increase in surface area of the Li$_{1-x}$Mn$_2$O$_4$ particles Compared with the surface area of LiMn$_2$O$_4$ particles made at 850° C., despite a relatively small difference in the average particle size, i.e. about 3 microns for Sample 3 and about 6 microns for Sample 6. For example, the surface area of a Li$_{1-x}$Mn$_2$O$_4$ cathode prepared at 400° C. from MnCO$_3$ and Li$_2$CO$_3$ is 78.3 m$^2$/g compared to an Li/Mn$_2$O$_4$ cathode made from MnCO$_3$ and Li$_2$CO$_3$ at 850° C.

which has a surface area of only 2m²/g. For comparison, a typical gamma-MnCO$_3$ cathode used in primary Li/MnCO$_3$ cells, heated to 350° C. has a surface area of 29.6 m²/g.

TABLE

| Sample No | | m²/g |
| --- | --- | --- |
| Control 1 | Electrolytic manganese dioxide (gamma-MnO$_2$) | 50.1 |
| Control 2 | Sample No 1 heated to 350° C. for 24 hours | 29.6 |
| Invention 3 | Li$_{1-x}$Mn$_2$O$_4$ made at 400° C. from MnCO$_3$ + Li$_2$CO$_3$ | 78.3 |
| Invention 4 | Li$_{1-x}$MnO$_4$ made at 550° C. from MnCO$_3$ + Li$_2$CO$_3$ | 31.9 |
| Control 5 | Li$_{1-x}$Mn$_2$O$_4$ made at 700° C. from MnCO$_3$ + Li$_2$CO$_3$ | 8.1 |
| Control 6 | Li$_{1-x}$Mn$_2$O$_4$ made at 850° C. from MnCO$_3$ + Li$_2$CO$_3$ | 2.0 |
| Control 7 | Li$_{1-x}$Mn$_2$O$_4$ made at 1000° C. from MnCO$_3$ + Li$_2$CO$_3$ | 0.7 |
| Control 8 | LiMn$_2$O$_4$ made at 700° C. from Mn$_2$O$_3$ + Li$_2$CO$_3$ | 2.2 |

Figure 1:
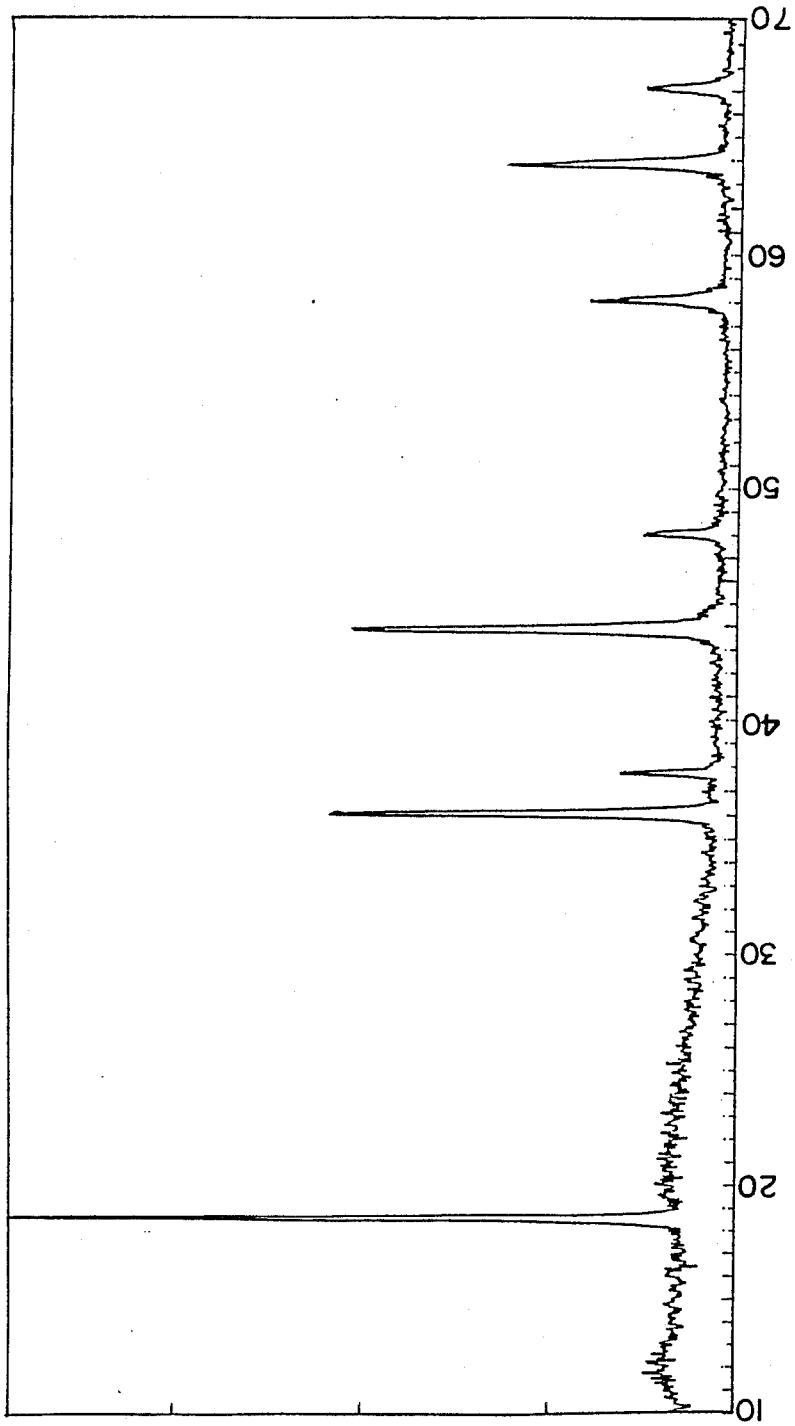
FIG. 1, a control, shows $LiMn_2O_4$ produced from $4Mn_3O_4+3LiCO_3$ heated to 800° C. in air.
Figure 2:
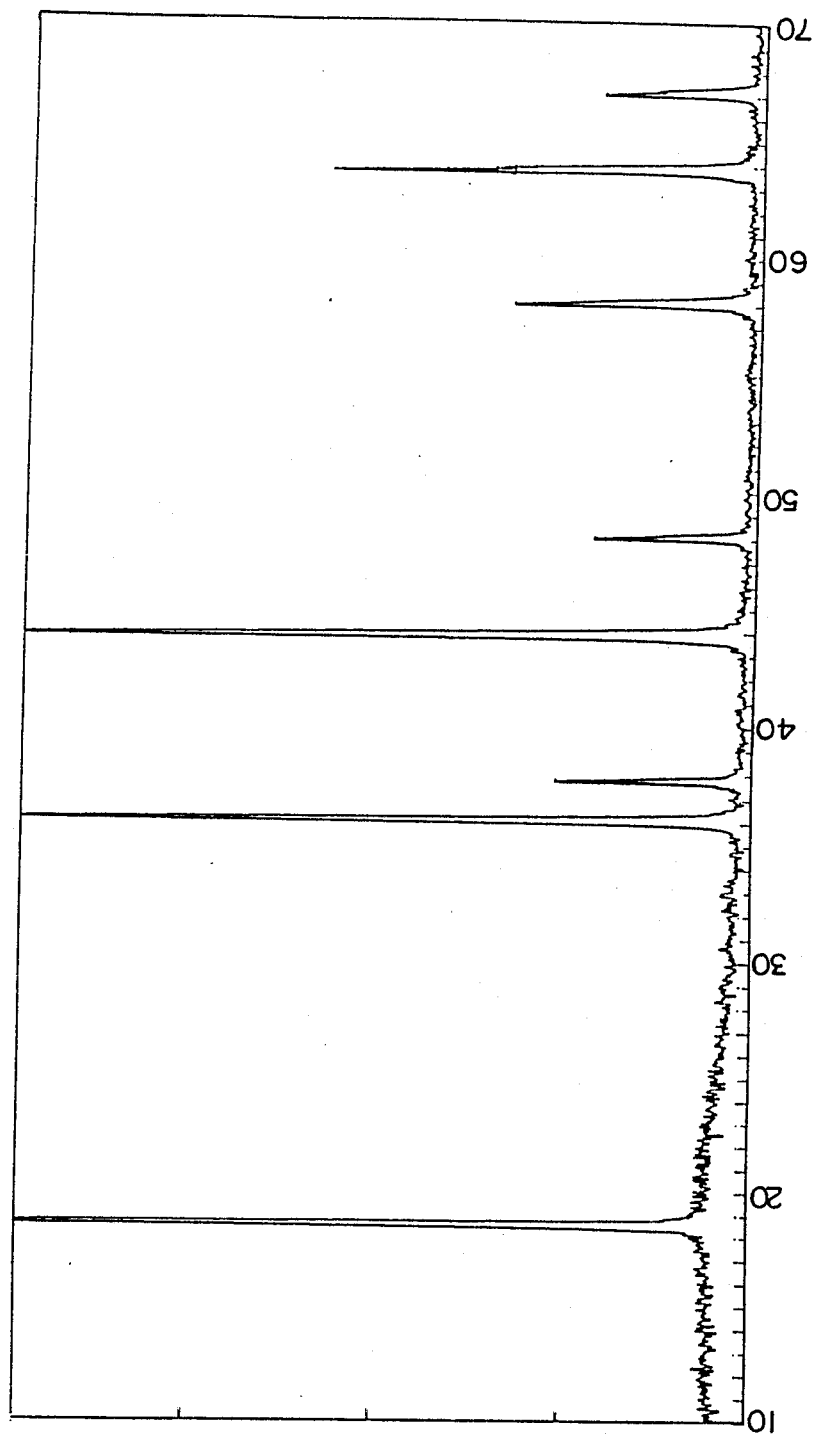
FIG. 2, a control, shows $LiMn_2O_4$ produced from $2Mn_2O_3+Li_2CO_3$ heated to 800° C. in air.
Figure 3:
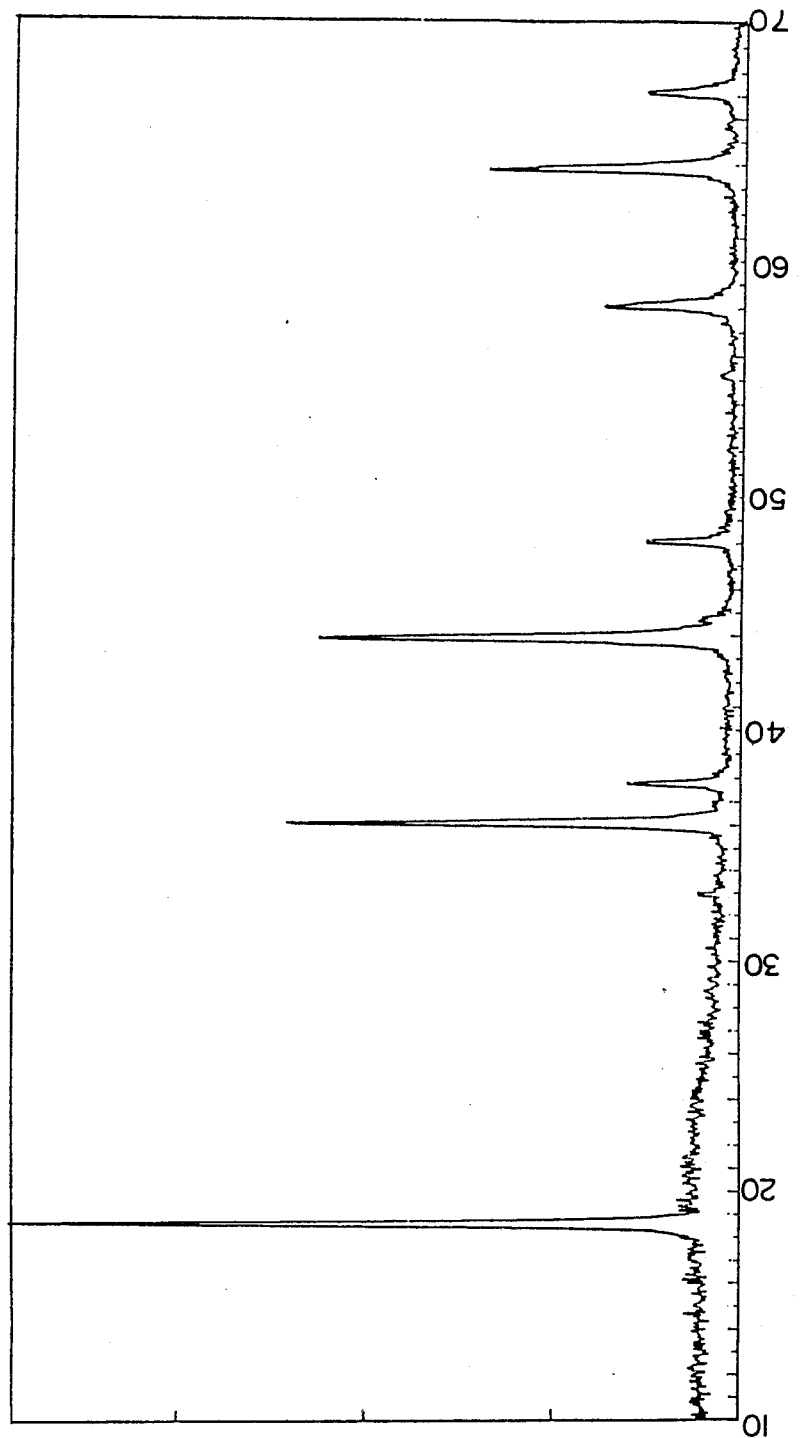
FIG. 3, a control, shows $LiMn_2O_4$ produced from $4MnCO_3+Li_2CO_3$ heated to 800° C. in air.
Figure 4:
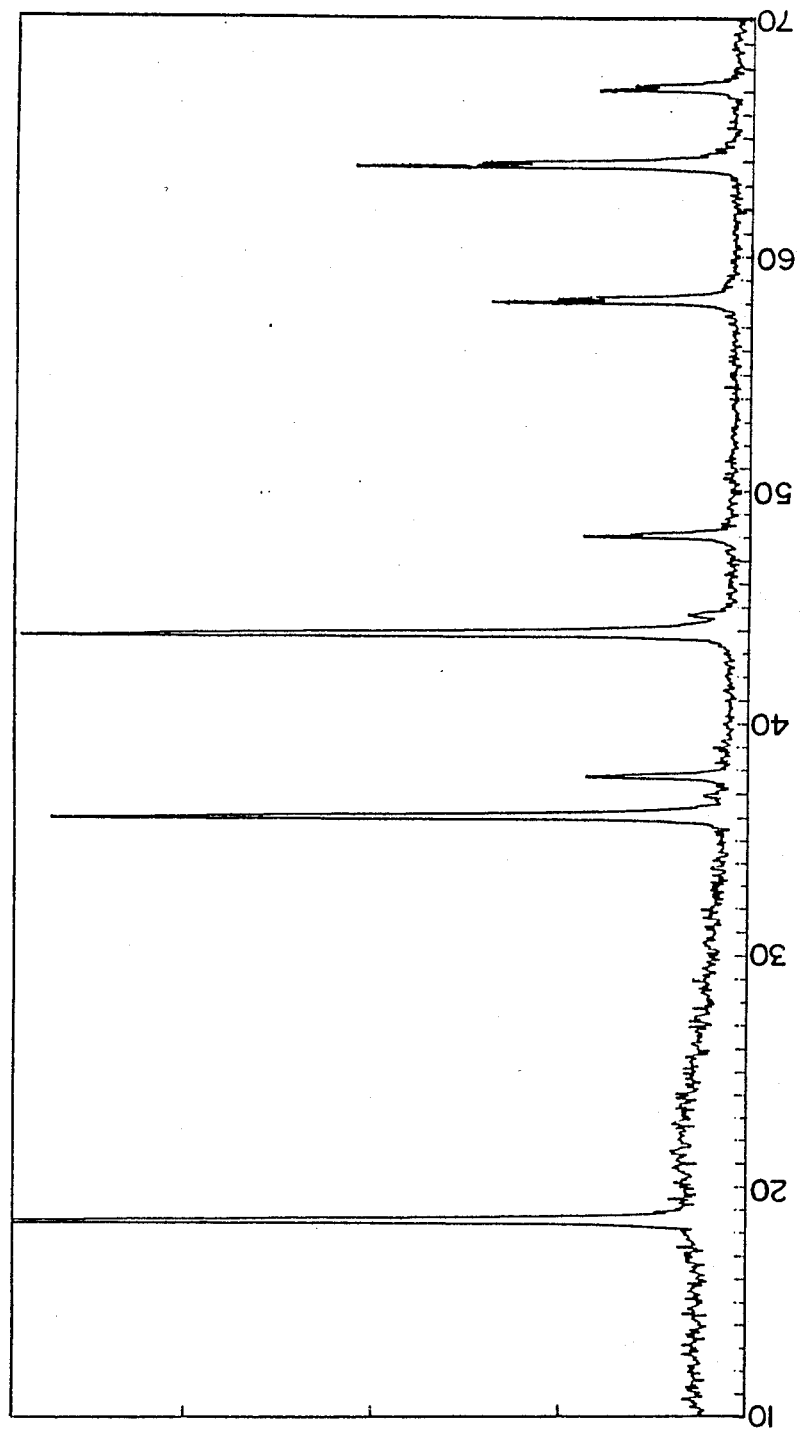
FIG. 4, a control, shows $LiMn_2O_4$ produced from $4MnCO_3+Li_2CO_3$ heated to 800° C. in air.
Figure 5:
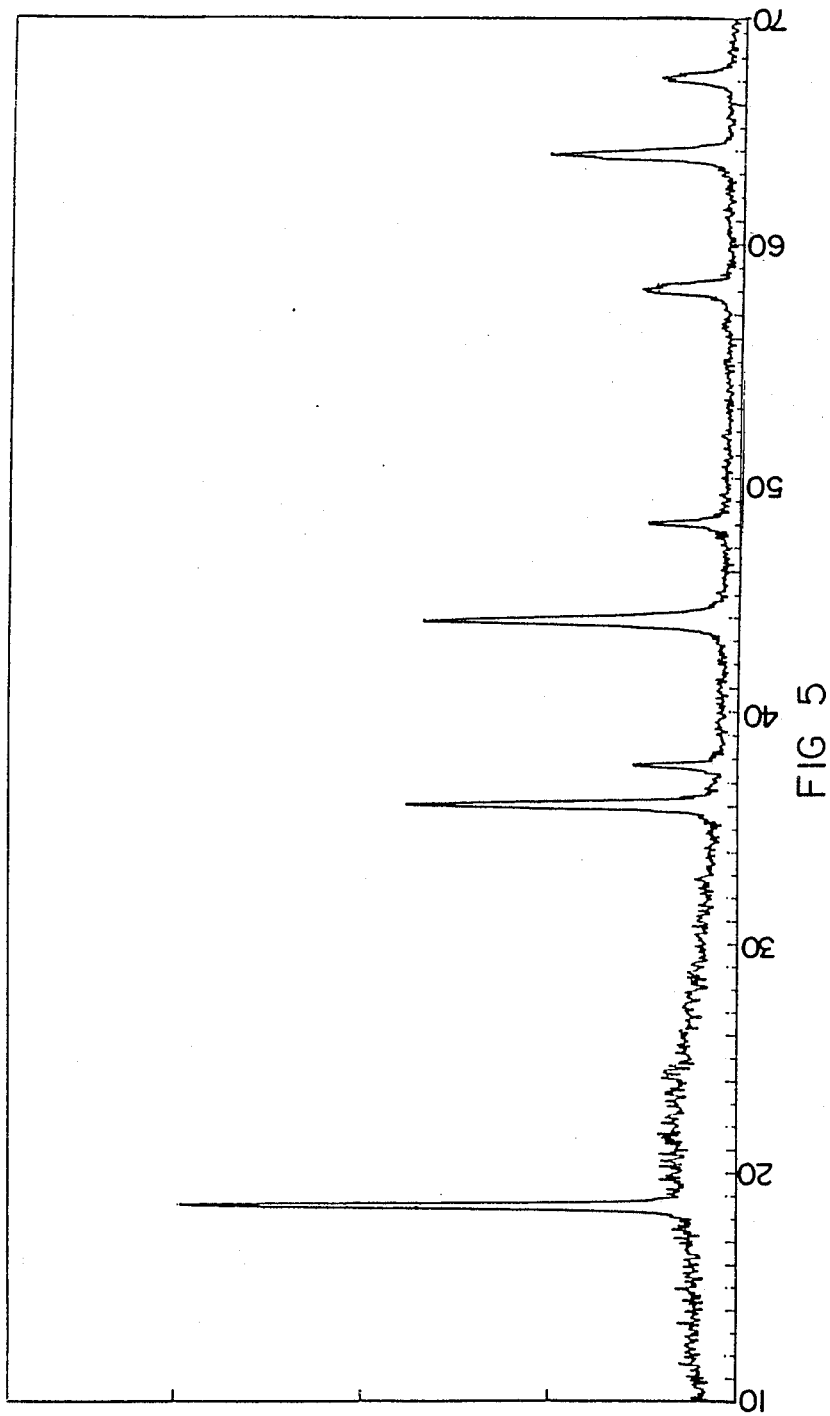
FIG. 5, a control, shows $LiMn_2O_4$ produced from $2Mn(NO_3)_2.4H_2O+LiNO_3.3H_2O$ heated to 800° C. in air.

Typical X-ray diffraction patterns of Sample No. 3, the invention, and Sample No. 6, a control, are shown in FIGS. 9 and 4, respectively.

Figure 14:
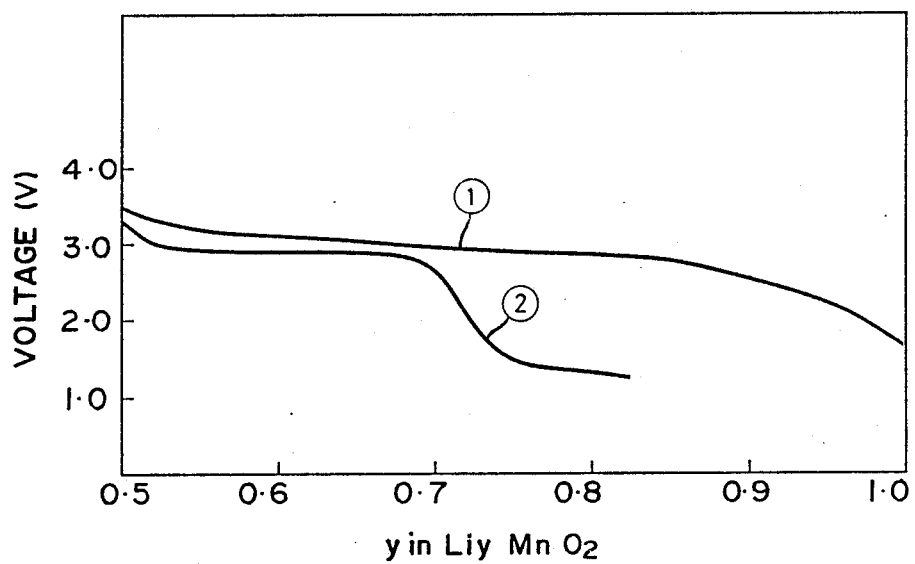
FIG. 14 shows discharge curves of an electrochemical cell having a cathode according to the invention and a control, being a plot of cell voltage (V) against the amount of lithium in the cathode.

Representative initial discharge curves of Li$_y$MnO$_2$ cells having (1) an Li$_{1-x}$Mn$_2$O$_4$ cathode (i.e. an Li$_y$MnO$_2$ cathode in which y is about 0.5) made at 400° C.; and (2) an LiMn$_2$O$_4$ cathode made at 850° C. are shown in FIG. 14. These curves clearly illustrate, in terms 10 of increased capacity, the advantage of cathodes in accordance with the invention. It should be noted that, in the Li of the cathode made at 400° C., 0.5 Li ions are inserted into each MnCO$_3$ framework unit during discharge whereas, in the Li$_y$MnO$_2$ cathode prepared at 850° C., only 0.2 Li ions are inserted (to a cut-off voltage of 2.0 V). The Li$_y$MnO$_2$ of the cathode of the present invention has a theoretical fully charged state in which y is 0; and a fully discharged state in which y is 1. In FIG. 14, Plot 1 is according to the invention and Plot 2 is the control.

Figure 15:
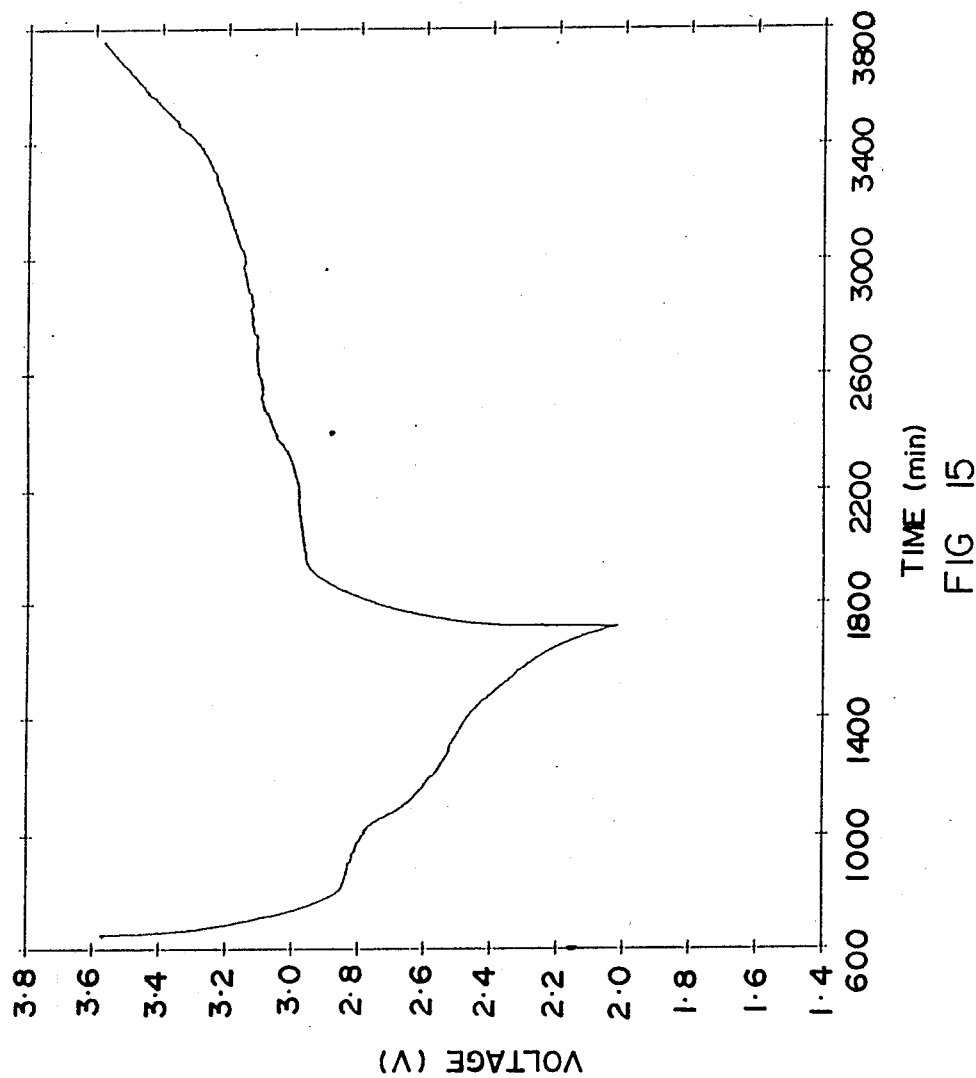
FIG. 15 shows a charge/discharge cycle of a cell according to the invention, being a plot of voltage (V) against time minutes.

FIG. 15 shows the 4th charge/discharge cycle of a Li/Li$_{1-x}$Mn$_2$O$_4$ cell according to the invention. The cut-off voltages for cycling were 3.6 V (charge) and 2.0 V (discharge). The cell comprised 34.6 mg of Li$_{1-x}$-Mn$_2$O$_4$ cathode admixed with 8.6g of PTFE and 17.2 g of acetylene black The discharge current was 300 μA/cm² and the charge current was 150 μA/cm². During this cycle the discharge time was 1080 minutes and the charge time 2040 minutes. This corresponds to an insertion of 1.05 Li ions into each Mn$_2$O$_4$ unit during discharge and extraction of 1.00 Li ions during charge, which highlights the excellent reversibility of the cell.

An advantage of the invention is that it provides a cell, potentially suitable for primary or rechargeable use, of simple design, low cost and good shelf life, operable over a wide range of values of y in Li$_y$MnO$_2$, which wide range of values and acceptable charging/discharging rates are promoted by the relatively poor crystallinity and high surface area of the Li$_{1-x}$Mn$_2$O$_4$ cathode.

The Applicant believes that the exceptional utility promised by the present invention for use as a reversible or secondary cathode in electrochemical cells of the type in question, arises from the reversible behavior of the cathode with regard to insertion and extraction of Li$^+$ ions respectively during charging and discharging. This reversibility is believed to arise from the exceptionally high surface areas associated with the relatively poor crystallinity displayed by the Li$_{1-x}$Mn$_2$O$_4$ of the present invention. This is associated with enhanced internal porosity of particles of the Li$_{1-x}$Mn$_2$O$_4$, promoting said reversibility. A yet further advantage of the present invention is the advantageously high capacity of the Li$_{1-x}$Mn$_2$O$_4$ to receive Li$^+$ ions inserted therein during charging, leading to the attainment of enhanced capacities.

What is claimed is:

1. A method of synthesizing a lithium manganese oxide having a spinel-type crystal structure, the method comprising forming a mixture in finely divided solid form of at last one lithium salt and at least one manganese salt, and heating the mixture in air in an oxidizing atmosphere at a temperature in the range 200°–600° C. to cause said salts to react with each other to obtain said lithium manganese oxide having a spinel-type crystal structure, by simultaneous decomposition and cubic close packed oxygen lattice construction.

2. A method as claimed in claim 1, in which the salt of lithium is a member of the group consisting of LiCO$_3$, LiNO$_3$ and mixtures thereof and the salt of manganese is a member of the group consisting of Mn(NO$_3$)$_2$, MnCO$_3$O, and mixtures thereof.

3. A method as claimed in claim 1, in which forming the mixture is so that the molar ratio of Li:Mn is from 1:1.7 to 1:2.5.

4. A method as claimed in claim 1, in which forming the mixture is by milling such that the average particle size in the mixture is at most 250 microns.

5. A method as claimed in claim 1, in which forming the mixture is by making a slurry in a solvent selected from the group consisting of water, ethanol and mixtures thereof and thereafter drying the mixture until the solvent content thereof is at most 10% by mass.

6. A method as claimed in claim 1, in which the heating of the mixture is in air to a temperature of 300°–400° C., the mixture being held at the maximum temperature for a period of at least 2 hours.

7. A method as claimed in claim 1, which includes the step, prior to the heating, of compacting the mixture by pressing it at a pressur of 5–10 MPa to form a unitary artifact, so that, after the heating, the lithium manganese oxide is in the form of a self-supporting unitary artifact.

8. Lithium manganese oxide having a spinel crystal structure, synthesized by the method of claim 1.

9. An electrochemical cell having a cathode comprising a lithium manganese oxide as claimed in claim 8, an anode which comprises lithium metal or a lithium-containing alloy, and an electrolyte whereby the anode is electrochemically coupled to the cathode.

10. A cell as claimed in claim 9, in which the lithium manganese 15 oxide of the cathode is present in the cathode in admixture with a binder and with an electronically conductive current collector in a compacted artifact, the electrolyte being a room-temperature electrolyte comprising a member of the group consisting of LiClO$_4$, LiAsF$_6$ and LiBF$_4$ dissolved in an organic solvent selected from the group consisting of propylene carbonate and dimethoxyethane.

11. A method as claimed in claim 1, in which the lithium manganese oxide is in accordance with the formula Li$_{1-x}$Mn$_2$O$_4$ in which 0x<1.

12. A method as claimed in claim 11, in which the Li$_{1-x}$Mn$_2$O$_4$ has a (Mn$_2$)O$_4$ (Mn$_2$)O$_4$$^{n-}$) 1 framework structure in which the quantity of Mn cations varies from the stoichiometric value.

* * * * *

UNITED STATES PATENT AND TRADEMARK OFFICE
CERTIFICATE OF CORRECTION

PATENT NO. : 4,980,251

DATED : December 25, 1990

INVENTOR(S) : Thackeray, et al

It is certified that error appears in the above-identified patent and that said Letters Patent is hereby corrected as shown below:

Column 1, line 38, "an" should be --and--.

Column 2, line 9, "ne.g.atively" should be --negatively--.

Column 2, lines 13-14, "tetrehedral" should be --tetrahedral--.

Column 2, line 27, after "$(B_2)X_4^{n-})$" insert --host--.

Column 2, line 28, "re.g.arded" should be --regarded--.

Column 2, line 41, "lithium-defici.e.nt" should be --lithium-deficient--.

Column 2, lines 48-49, "occupi.e.d" should be --occupied--.

Column 2, line 50, "occupi.e.d" should be --occupied--.

Column 2, line 55, "occupi.e.d" should be --occupied--.

Column 2, lines 67-68, do not hyphenate "$Li_yMnO_2$".

Column 2 line 68, Column 3, line 1, do not hyphenate "$Li_yMnO_2$".

Column 3, line 6, "conveni.e.ntly" should be --conveniently--.

Column 3, line 11, "LiyMnO2" should be --$Li_yMnO_2$--.

Column 3, line 17, "conveni.e.nt" should be --convenient--.

Column 3, line 21, after "in" delete "(".

Column 3, line 30, "anode" should be --cathode--.

Column 3, line 36, "conveni.e.nt" should be --convenient--.

Column 4, line 4, "$Li_20.4MnO$" should be --$Li_2O.4MnO$--.

UNITED STATES PATENT AND TRADEMARK OFFICE
CERTIFICATE OF CORRECTION

PATENT NO. : 4,980,251

DATED : December 25, 1990

INVENTOR(S) : Thackeray, et al

It is certified that error appears in the above-identified patent and that said Letters Patent is hereby corrected as shown below:

Column 4, line 23, "With" should be --with--.

Column 4, line 28, "$4Mn_3O_4+3LiCO_3$" should be --$4Mn_3O_4+3Li_2CO_3$--.

Column 4, line 34, "$4MnCO_3+Li_2CO_3$" should be --$4MnO_2+Li_2CO_3$--.

Column 4, line 43, "$4MnCO_3+Li_2CO_3$" should be --$4MnO_2+Li_2CO_3$--.

Column 4, line 48, "$4Mn(NO2)_3.4H_2O+LiNO_3.3H_2O$" should be --$Mn(NO_3)_2.4H_2O+LiNO_3.3H_2O$--.

Column 4, line 52, "$Mn_2O_3$" should be --$2Mn_2O_3$--.

Column 4, line 58, "$MnCO_3$" should be --$4MnCO_3$--.

Column 5, line 3, "minutes" should be --(minutes)--.

Column 5, line 59, "'$Li_2O.4MnO$'", should be --'$Li_2O.4MnO$'--.

Column 5, line 60, delete "(20".

Column 5, line 62, "With" should be --with--.

Column 6, line 2, after "above" insert --.--.

Column 6, line 18, "pTFE" should be --PTFE--.

Column 6, line 37, after "using" insert --1--.

Column 6, line 42, "With" should be --with--.

Column 6, line 53, "gamma-$MnCO_3$" should be --gamma-$MnO_2$--.

UNITED STATES PATENT AND TRADEMARK OFFICE
CERTIFICATE OF CORRECTION

PATENT NO. : 4,980,251

DATED : December 25, 1990

INVENTOR(S) : Thackeray, et al

It is certified that error appears in the above-identified patent and that said Letters Patent is hereby corrected as shown below:

Column 6, line 54, "Li/MnCO$_3$" should be --Li/MnO$_2$--.

Column 6, line 61, "Compared" should be --compared--.

Column 6, lines 67-68, "Li/Mn$_2$O$_4$" should be --Li$_{1-x}$Mn$_2$O$_4$--.

Column 7, line 2, "gamma-MnCO$_3$" should be --gamma-MnO$_2$--.

Column 7, line 3, "Li/MnCO$_3$" should be --Li/MnO$_2$--.

Column 7, line 29, delete "10".

Column 7, line 32, "Li" should be --Li$_y$MnO$_2$--.

Column 7, line 33, "MnCO$_3$" should be --MnO$_2$--.

Column 7, line 45, "8.6g" should be --8.6mg--.

Column 7, line 45, "17.2g" should be --17.2mg--.

Column 7, line 66, "charging and discharging" should be --discharging and charging--.

Column 8, line 7, "charging" should be --discharging--.

Column 8, line 24, Claim 2, "MnCO$_3$O" should be --MnCO$_3$--.

Column 8, line 42, Claim 7, "pressur" should be --pressure--.

Column 8, line 53, Claim 10, delete "15".

Column 8, line 63, Claim 11, "0x<1" should be --$0 \leq x < 1$--.

UNITED STATES PATENT AND TRADEMARK OFFICE
CERTIFICATE OF CORRECTION

PATENT NO. : 4,980,251

DATED : December 25, 1990

INVENTOR(S) : Thackeray, et al

It is certified that error appears in the above-identified patent and that said Letters Patent is hereby corrected as shown below:

Column 8, line 65, Claim 12, delete "$(Mn_2)O_4$".

Column 8, line 65, Claim 12, delete "1".

Signed and Sealed this

Fifteenth Day of December, 1992

Attest:

DOUGLAS B. COMER

Attesting Officer     Acting Commissioner of Patents and Trademarks